US008626769B1

(12) United States Patent
Bhatt (10) Patent No.: US 8,626,769 B1
(45) Date of Patent: Jan. 7, 2014

(54) COMMUNITY CONTRIBUTED RULES IN ONLINE ACCOUNTING SYSTEMS

(75) Inventor: Patanjali Bhatt, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 89 days.

(21) Appl. No.: 13/451,896

(22) Filed: Apr. 20, 2012

(51) Int. Cl.
*G06F 17/30* (2006.01)

(52) U.S. Cl.
USPC .......................................... 707/740; 707/771

(58) Field of Classification Search
USPC .................. 707/709–723, 736–741, 770–774
See application file for complete search history.

(56) References Cited

U.S. PATENT DOCUMENTS

| | | | |
|---|---|---|---|
| 2007/0016486 A1* | 1/2007 | Stone et al. ...................... 705/26 |
| 2009/0157614 A1* | 6/2009 | Smith et al. ....................... 707/3 |
| 2011/0173529 A1* | 7/2011 | Wagner .......................... 715/235 |
| 2012/0303494 A1* | 11/2012 | Olave et al. ...................... 705/30 |
| 2012/0316962 A1* | 12/2012 | Rathod ........................ 705/14.54 |
| 2012/0324538 A1* | 12/2012 | Malegaonkar et al. ........... 726/4 |

* cited by examiner

*Primary Examiner* — Wilson Lee
(74) *Attorney, Agent, or Firm* — Osha Liang LLP (57) ABSTRACT

A method of classification within an accounting application, including receiving metadata from users of the accounting application, where the metadata includes one or more user defined classification tags associated with one or more accounts of the accounting application, creating one or more community defined classification tags from the metadata, where the one or more community defined classification tags specify an category organization of the one or more accounts within the accounting application, and sending, in response to a request from a particular user's instance of the accounting application, the one or more community defined classification tags to the particular user's instance of the accounting application.

21 Claims, 7 Drawing Sheets

COMMUNITY CONTRIBUTED RULES IN ONLINE ACCOUNTING SYSTEMS

BACKGROUND

Autofill is a function in some computer applications or programs, typically those containing forms, which fills in a data entry field automatically. In some accounting applications, when entering a transaction as a line item in a form typically, accountants may receive prompts for autofill of account categories, check numbers, deposit references, etc. based on a previous entry of the line item. For example, if accountant X enters a transaction for "ABC Plumbing Store" and assigns it "HARDWARE EXPENSES" category, the accounting application remembers this and, the next time accountant X enters another transaction for "ABC Plumbing Store", the accounting application prompts with a pre-fill of "HADWARE EXPENSES." However, if another user, say accountant Y, from the same accounting firm enters yet another transaction for "ABC Plumbing Store" in accountant Y's copy of the accounting application, that user may not be prompted with any autofill category, requiring that accountant Y to manually check with accountant X regarding whether any category has been previously assigned to avoid proliferation in inconsistently assigned categories. In a typical accounting firm, there may be hundreds of transactions entered by multiple accountants on behalf of scores of clients, thus creating a huge inefficiency in recording these transactions.

SUMMARY

In general, in one aspect, the invention relates to a method of classification within an accounting application. The method includes receiving metadata from a plurality of users of the accounting application, wherein the metadata comprises one or more user defined classification tags associated with one or more accounts of the accounting application, creating, by a computer processor, one or more community defined classification tags from the metadata, wherein the one or more community defined classification tags specify an category organization of the one or more accounts within the accounting application, and sending, in response to a first request from a particular user's instance of the accounting application, the one or more community defined classification tags to the particular user's instance of the accounting application, wherein the one or more community defined classification tags are configured to be used by the particular user's instance of the accounting application for presenting, according to the category organization of the one or more accounts, information regarding the particular user's instance of the accounting application to the user.

In general, in one aspect, the invention relates to a computer system for classification within an accounting application. The computer system includes a processor, a user module executing on the processor and configured to receive metadata from a plurality of users, wherein the metadata comprises one or more user defined classification tags associated with one or more accounts of an accounting application, and send, in response to a first request from a particular user's instance of the accounting application, one or more community defined classification tags to the particular user's instance of the accounting application, and a community input analyzer executing on the processor and configured to create the one or more community defined classification tags from the metadata, wherein the one or more community defined classification tags specify a category organization of the one or more accounts within the accounting application, wherein the one or more community defined classification tags are configured to be used by the particular user's instance of the accounting application for presenting, according to the category organization of the one or more accounts, information regarding the particular user's instance of the accounting application to the user.

In general, in one aspect, the invention relates to a non-transitory computer readable storage medium comprising instructions, that when executed, comprise functionality to receive metadata from a plurality of users of the accounting application, wherein the metadata comprises one or more user defined classification tags associated with one or more accounts of the accounting application, create one or more community defined classification tags from the metadata, wherein the one or more community defined classification tags specify an category organization of the one or more accounts within the accounting application, and send, in response to a first request from a particular user's instance of the accounting application, the one or more community defined classification tags to the particular user's instance of the accounting application, wherein the one or more community defined classification tags are configured to be used by the particular user's instance of the accounting application for presenting, according to the category organization of the one or more accounts, information regarding the particular user's instance of the accounting application to the user.

Other aspects of the invention will be apparent from the following detailed description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention provide a method and system to collect each user's first time entries of categories or subsequent reclassification of categories in an accounting application, and recording those in a "social/community contribution" database (also referred to as a user behavior database). Based on this social/community contribution database, the accounting application performs an autofill function that prompts all users with options to adopt community defined categories. For example, if accountant X were assigning "ABC Plumbing Store" to "HARDWARE EXPENSES" category, that information will now become available based on pre-determined criteria and in a central repository (also referred to as the rules database) for that accounting firm, allowing subsequent users, such as accountant Y, to benefit from the social/community contribution of other users.

In a similar fashion, accountants will set up rules in an accounting application that capture certain tasks such as adjusting for depreciation, prepaid insurance, etc. This may be done through a user interface (UI) that offers the accountant a formula and the periodicity for executing the adjustment. According to the setting, the task is periodically executed and corresponding journal entries are made. For example, if the accountant sets a rule such as "Adjust Insurance Premium by $1/12$ every month," the following will happen on a monthly basis: account "PREPAID INSURANCE" is credited $1/12$ the insurance premium and account "INSURANCE EXPENSES" is debited that same amount. Similar to sharing the user assigned category in the community database as community defined category, the periodicity for conducting such task and the required formula used by a user may also be shared via the community contributed rules database as community defined periodicity and/or community defined formula. For example, the community defined periodicity and/or community defined formula may be used to perform an autofill functionality, which prompts all users with options to adopt them.

In another example, in the case of account receivable (A/R) write-offs, the users may choose not to set a rule. The statistical behaviors of write-offs among many accountants may be tracked to determine that the average value written off is $225 after 6 months. This can be converted into a community defined rule and used in the same manner as described above.

Figure 1:
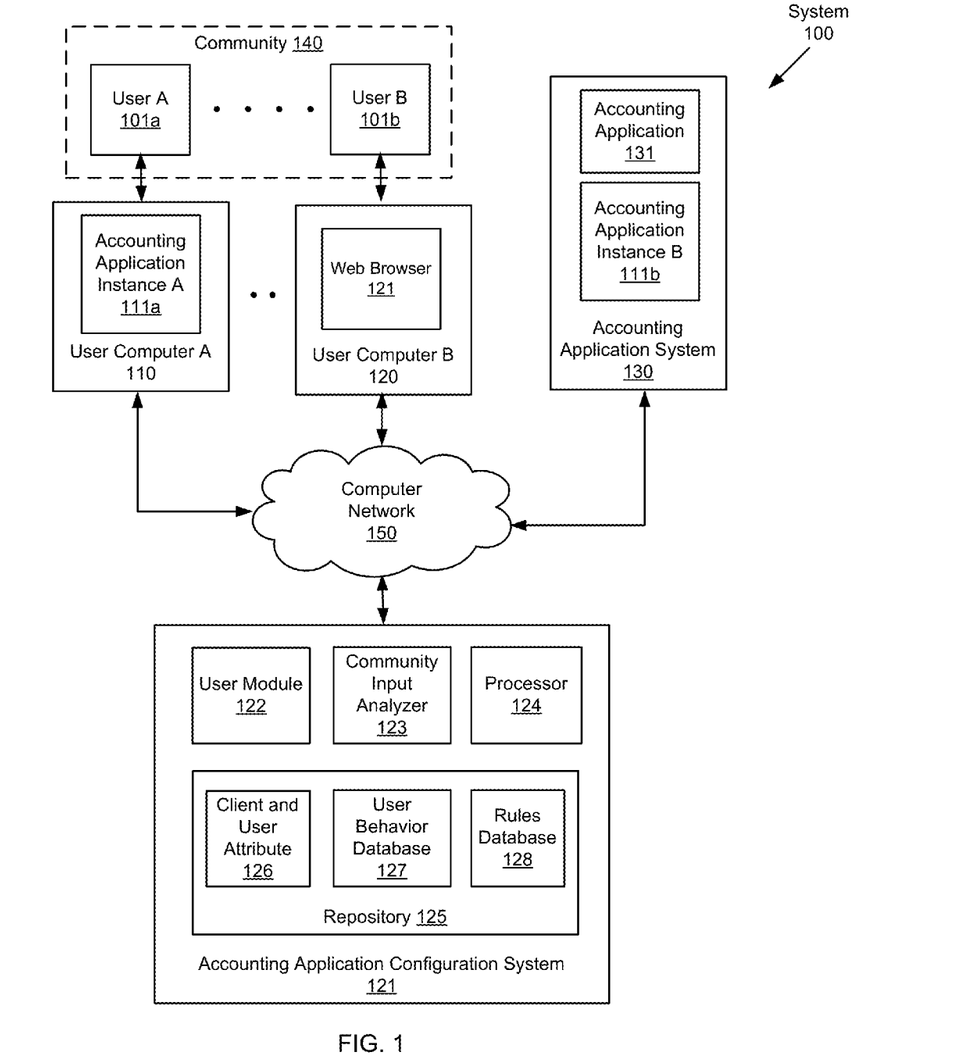
FIG. 1 shows a schematic diagram of a system for community contributed rules in online accounting systems in accordance with one or more embodiments of the invention.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a system for community contributed rules in online accounting systems in accordance with embodiments disclosed herein.

As shown in FIG. 1, the system (100) includes a user A (101a) who is a user of a user computer A (110) executing accounting application instance A (111a), a user B (101b) who is a user of a user computer B (120) installed with a web browser (121) configured to access via a computer network (150) accounting application instance B (111b) executing on an accounting application system (130). In addition, the system (100) includes an accounting application configuration system (121) to configure parameters of the accounting application instance A (111a) and the accounting application instance B (111b). In one or more embodiments of the invention, each of the accounting application instance A (111a) and the accounting application instance B (111b) is a copy of the accounting application (130). Accordingly, the user A (101a) and the user B (101b) are also referred to as users of the accounting application (130). Although not explicitly shown, there may be multiple users each using respective user computer to execute, either locally or via the computer network (150), a respective instance of the accounting application (130). These multiple users form a community (140). In one or more embodiments, the user computer A (110) and the user computer B (120) may be a desktop computer, a notebook computer, a tablet computer, a smartphone, or other computing device configured with data communication capability. In one or more embodiments of the invention, the computer network (150) may include local area network, wide area network, Internet, mobile phone network, WIFI, or any other suitable wired and/or wireless data network.

In one or more embodiments, the users (e.g., user A (101a), user B (101b)) of the community (140) may be accountants who work for an accounting firm that provides accounting service to a number of clients. Each client may be assigned an account to organize its accounting information using the accounting application (130). For example, the accounting information of each client may be recorded in a journal of its account by the accountants. Once recorded, the accountants may also use the accounting application (130) to generate various accounting reports for the client based on the recorded journal. The accounting report may be related to or based on tasks performed on the accounting information, such as depreciation of an asset, write-off of a receivable, etc.

In one or more embodiments, the accounting information recorded in the journal is categorized into multiple categories that are classified using classification tags. For example, such categories may be used to organize the accounting information into sales transaction, account receivable, account payable, expense, depreciation, etc. Each category may be further divided into sub-categories, such as cash transaction sub-category and credit card transaction sub-category under the sales transaction category, hardware expense sub-category and travel expense sub-category under the expense category, etc. In particular, sales transaction, cash transaction, credit card transaction, account receivable, account payable, expense, depreciation, etc. are referred to as classification tags that describe the categories and sub-categories. The structure of the categories and sub-categories is referred to as the category organization. Generally, the accounting information and various reports derived therefrom are presented, according to the category organization, to the accountants (e.g., user A (101a), user B (101b)) for review before presenting to the clients. In one or more embodiments, a single category organization may be used for multiple client accounts that are in the same industry and sharing similar characteristics. For example multiple clients in manufacturing business may share the same category organization to organize accounting information for their accounts. In one or more embodiments, different category organizations may be used for different client accounts that are in different industries and having different characteristics. For example a client in manufacturing business and another client in personal service business may use different category organizations. Generally, different clients may have different requirements for category organization to present accounting information and reports, as well as different requirements for other aspects of accounting tasks, such as determining depreciation, write-off, etc.

In one or more embodiments, the accounting application configuration system (121) includes a user module (122) and a community input analyzer (123), which are software and/or firmware modules executing on the processor (124). In one or more embodiments, the processor (124) may be a microprocessor or any other computer circuit capable of executing software instructions. As shown in FIG. 1, the accounting application configuration system (121) further includes the repository (125) that is configured to store client and user attribute (126), user behavior database (127), and rules database (128). In one or more embodiments, the repository (125) may be a disk storage device, a flash memory device, or other suitable memory or data storage device. Each module of the system (100) is described in details below.

In one or more embodiments, the user module (122) is configured to receive metadata from users of the community (140), where the metadata includes one or more user defined classification tags associated with one or more accounts of the accounting application (130). For example, the user A (101a) may have defined a classification tag "HARDWARE EXPENSE" to categorize purchases made by client X from the vendor "ABC Plumbing Store" while the user B (101b) may have defined a classification tag "MICELLANEOUS EXPENSE" to categorize purchases made by client Y from the vendor "ABC Plumbing Store." In one or more embodiments, such user actions in defining these classification tags are referred to as user behaviors that occur when the user enters for the first time, or subsequently reclassify, a transaction associated a particular client and a particular vendor. In one or more embodiments, the user behaviors are captured by the user module (122) as metadata and stored in the user behavior database (127). In one or more embodiments, the stored metadata may be used to perform the autofill functionality when the user later enters another transaction associated with the same client and the same vendor.

In one or more embodiments, the user behavior database (127) is structured to index the classification tags by the user, client, vendor (or payee), and/or customer (or payor) associated with the accounting record for which the classification tag is initially defined. For example in the user behavior database (127), the classification tag "HARDWARE EXPENSE" is indexed by a user identifier of the user A (101a) and a vendor identifier of the vendor "ABC Plumbing Store" while the classification tag "MICELLANEOUS EXPENSE" is indexed by another user identifier of the user B (101b) and the vendor identifier of the vendor "ABC Plumbing Store." In one or more embodiments, attributes of the user (e.g., user A (101a), user B (101b)) and the clients (not shown) are also captured by the user module (122) as metadata and stored as the client and user attribute (126). For example, the user attribute may include title, job code, seniority, experience level, authority, etc. of the user (e.g., user A (101a), user B (101b)) while the client attribute may include industry, location, employee count, revenue size, client specified requirement, etc.

In one or more embodiments, the user module (122) is further configured to send one or more community defined classification tags to a particular user's instance of the accounting application (130). For example, a community defined classification tag may be sent when it is generated, when a pre-determined event occurs, or in response to a request from the particular user's instance (e.g., accounting application instance A (111a), accounting application instance B (111b)) of the accounting application (130). In one or more embodiments, the one or more community defined classification tags are configured to be used by the particular user's instance (e.g., accounting application instance A (111a), accounting application instance B (111b)) of the accounting application (130) for performing the autofill functionality. Based on the autofilled classification tag(s) (i.e., the community defined classification tag(s)) being accepted by the particular user, the community defined classification tags are used to organize the accounting information in the particular user's instance (e.g., accounting application instance A (111a), accounting application instance B (111b)) of the accounting application. For example, the user A (101a) may accept the autofilled classification tag(s) (i.e., the community defined classification tag(s)) and uses them to organize and present information regarding the particular user's instance of the accounting application (130) according to the category organization specified by the community defined classification tags. In one or more embodiments, the category organization is used to group accounting information of the one or more accounts based on the community defined classification tags. In one or more embodiments, the category organization includes a hierarchical structure of community defined classification tags. In one or more embodiments, the accounting application (130) may initially have a default category organization, which may be modified later based on the community defined classification tags.

In one or more embodiments, the community input analyzer (123) is configured to create the aforementioned one or more community defined classification tags from metadata stored in the user behavior database (127) and the client and user attribute (126). In one or more embodiments, the one or more community defined classification tags are selected from the various user defined classification tags and represent a preferred category organization, based on community inputs of the community (140), within the accounting application (130). In one or more embodiments, a community defined classification tag used to categorize accounting records associated with a vendor (or a payee) is selected from those user defined classification tags indexed in the user behavior database (127) by the vendor identifier of the vendor. For example, these user defined classification tags associated with the same vendor may be scored based on the time when they are each defined, a tally of how many users define the same classification tags, the user attributes of the users defining them, the client attributes of the clients associated with them, or combinations thereof. For example, the user defined classification tag that was defined first may be treated as the precedence and selected as the community defined classification tag. In another example, the user defined classification tag that was commonly defined by most number of users may be treated as the majority and selected as the community defined classification tag. In yet another example, the user defined classification tag that was defined by a user having the most significant title, job code, seniority, experience level, authority may be treated as carrying highest weight and selected as the community defined classification tag. In still another example, the community defined classification tag may be selected based on a requirement imposed by client industry or other client attribute or client specification.

In one or more embodiments, a score is calculated for each user defined classification tag used to categorize accounting records associated with a vendor based on a pre-determined weighting scheme of the title, job code, seniority, experience level, and authority of the user and industry or other client attribute or client specification of the client. Accordingly, the community defined classification tag is selected based on the scores of the user defined classification tags. In one or more embodiments, a community defined classification tag used to categorize accounting records associated with a customer (or payor) is selected in a similar way as selecting the community defined classification tag used to categorize accounting records associated with a vendor.

In one or more embodiments, the community input analyzer (123) is further configured to create a community defined formula from the metadata. In addition to the user defined classification tags described above, the metadata further includes one or more user defined formulae for performing a pre-determined calculation of the accounting application (130) by a corresponding user. By the same token, the community defined formula specifies a community method to perform the pre-determined calculation. For example, the formula may be used to calculate depreciation of a particular type of asset (e.g., computer equipment, production equipment, factory building, business vehicle, etc.) of the client. In such embodiments, the community input analyzer (123) is configured to select the community defined formula from various user defined formulae in a similar way as selecting the community defined classification tags from various user defined classification tags. In such embodiments, the user module (122) is further configured to send the community defined formula to the particular user's instance (e.g., accounting application instance A (111a), accounting application instance B (111b)) of the accounting application (130). For example, a community defined formula may be sent when it is generated, when a pre-determined event occurs, or in response to a request from the particular user's instance (e.g., accounting application instance A (111a), accounting application instance B (111b)) of the accounting application (130).

In one or more embodiments, the community defined formula is configured to be used by the particular user's instance (e.g., accounting application instance A (111a), accounting application instance B (111b)) of the accounting application (130) for performing the autofill functionality. Based on the autofilled formula (i.e., the community defined formula) being accepted by the particular user, the community defined formula is used to perform the pre-determined calculation based on information regarding the particular user's instance of the accounting application (130). For example, the user A (101a) may accept the autofilled formula (i.e., the community defined formula) when prompted and uses the community defined formula to perform the depreciation calculation in the accounting application instance A (111a) based on specific asset book value information of a client account. In this manner, the community defined formula is used by the accounting application instance A (111a) to calculate the depreciation as it is accepted community-wide as the community method. In one or more embodiments, the accounting application (130) may initially have a default method to perform the depreciation calculation, which may be modified later based on the community defined formula.

In one or more embodiments, the community input analyzer (123) is further configured to create a community defined periodicity from the metadata. In addition to the user defined classification tags and the user defined formula described above, the metadata further includes one or more user defined periodicities associated with a recurring task of the accounting application (130) performed by a corresponding user. By the same token, the community defined periodicity specifies a periodicity, as agreed by users across the community (140), to perform the recurring task within the accounting application (130). For example, the periodicity may specify how frequent a payment (e.g., an insurance payment to "XYZ insurance company") is adjusted. In such embodiments, the community input analyzer (123) is configured to select the community defined periodicity from various user defined periodicities in a similar way as selecting the community defined classification tag from various user defined classification tags. In such embodiments, the user module (122) is further configured to send accounting application instance B (111b)) of the accounting application (130), the community defined periodicity to a particular user's instance (e.g., accounting application instance A (111a), accounting application instance B (111b)) of the accounting application (130). For example, a community defined periodicity may be sent when it is generated, when a pre-determined event occurs, or in response to a request from the particular user's instance (e.g., accounting application instance A (111a), accounting application instance B (111b)) of the accounting application (130). In one or more embodiments, the community defined periodicity is configured to be used by the particular user's instance (e.g., accounting application instance A (111a), accounting application instance B (111b)) of the accounting application (130) for performing the autofill functionality.

Based on the autofilled periodicity (i.e., the community defined periodicity) being accepted by the user, the community defined periodicity is used to initiate the recurring task based on information regarding the particular user's instance (e.g., accounting application instance A (111a), accounting application instance B (111b)) of the accounting application (130). For example, the user A (101a) may accept the autofilled periodicity (i.e., the community defined periodicity) when prompted and uses the community defined periodicity to initiate an insurance premium adjustment in the accounting application instance A (111a) based on specific insurance premium amount information of a client account. In this manner, the accounting application instance A (111a) adjusts the insurance premium according to the community defined periodicity as it is accepted community-wide as the adjustment frequency. In one or more embodiments, the accounting application (130) may initially have a default periodicity to perform the recurring task, which may be modified later based on the community defined periodicity.

Figure 2:
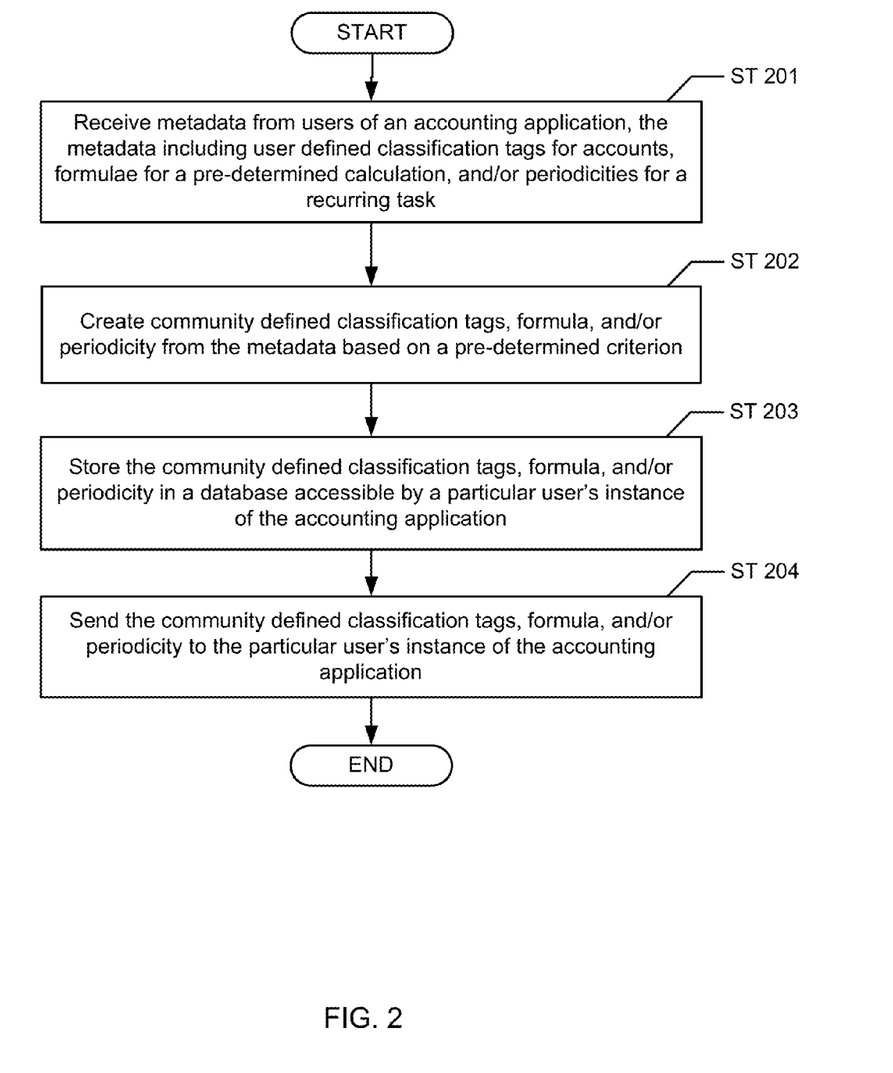
FIG. 2 shows a flowchart of a method for community contributed rules in online accounting systems in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1 above.

Initially in Step 201, metadata from users of an accounting application is received. For example, the users may be accountants in an accounting firm forming a community in sharing configurations of each other's instances of the accounting application. In particular, autofill parameters are shared among the users when recording and processing accounting information for clients of the accounting firm. In one or more embodiments, the metadata represents users' behaviors in interacting with the accounting application. For example, a user may define classification tags for categorizing information regarding an instance of the accounting application used by the user, a formula for a pre-determined calculation performed in the instance of the accounting application, and/or a periodicity for a recurring task performed in the instance of the accounting application. As noted above, the user actions in defining these classification tags, formulae, and/or periodicities are referred to as user behaviors that occur when the user enters for the first time, or subsequently reclassifies, a transaction associated a particular client and a particular vendor, or when the user performs for the first time, or subsequently modifies, a calculation and/or recurring task associated with a particular accounting record, such as an asset valuation or an accounting payment. In one or more embodiments, the metadata associated with a user describes a classification rule defined by the user regarding how accounting information is categorized, a calculation rule defined by the user regarding which formula to use for a pre-determined calculation, and a periodicity rule define by the user regarding how often a recurring task is performed. In one or more embodiments, the metadata also includes attributes of the users and clients, such as title, job code, seniority, experience level, authority, etc. of a user and industry, location, employee count, revenue size, specific requirement, etc. of a client.

In Step 202, a community defined rule is created from the metadata based on a pre-determined criterion. For example, the community defined rule may include a community defined classification rule regarding how accounting information is categorized, a community defined calculation rule regarding which formula to use for a pre-determined calculation, and a community defined periodicity rule regarding how often a recurring task is performed. In one or more embodiments, the community defined rule is created by selecting from user defined rules based on pre-determined criteria. For example, these user defined rules associated with the same vendor, customer, or same type of accounting record may be scored based on the time when they are each defined, a tally of how many users define the same rules, the user attributes of the users defining them, the client attributes of the clients associated with them, or combinations thereof. For example, the user defined rule that was defined first may be treated as the precedence and selected as the community defined rule. In another example, the user defined rule that was commonly defined by highest number of users may be treated as the majority and selected as the community defined rule. In yet another example, the user defined rule that was defined by a user having the most significant title, job code, seniority, experience level, authority may be treated as carrying highest weight and selected as the community defined rule. In still another example, the community defined rule may be selected based on a requirement imposed by client industry or other client attribute or client specification. In one or more embodiments, a score is calculated for each user defined rule associated with a vendor, a customer, or a type of accounting record based on a pre-determined weighting scheme of the title, job code, seniority, experience level, and authority of the user and industry or other client attribute or client specification of the client. Accordingly, the community defined rule is selected based on the scores of the user defined rules.

In Step 203, the community defined rules are stored in a database accessible by a particular user's instance of the accounting application. In one or more embodiments, the community defined classification tags are stored and indexed based on the associated vendors, customers, and/or clients. In one or more embodiments, the community defined formulae and periodicities are stored and indexed based on the associated accounting records, such as assets and/or accounting payments.

In Step 204, the community defined rules are sent to the particular user's instance of the accounting application. For example, a community defined rule may be sent when it is generated, when a pre-determined event occurs, or in response to a request from the particular user's instance of the accounting application. In one or more embodiments, the community defined rule is configured to be used by the particular user's instance of the accounting application for performing the autofill functionality. For example, based on the autofilled classification tag(s), (i.e., the community defined classification tag(s)) being accepted by the particular user, the community defined classification tags are used to organize the accounting information in the particular user's instance of the accounting application. Specifically, the user may accept the autofilled classification tag(s) (i.e., the community defined classification tag(s)) and uses them to organize and present information regarding the particular user's instance of the accounting application according to the category organization specified by the community defined classification tags. In this manner, the accounting application instance organizes/presents the accounting information according to the community defined classification tags as they are accepted community-wide as the category organization to use.

In another example, based on the autofilled formula (i.e., the community defined formula) being accepted by the particular user, the community defined formula is used to perform the pre-determined calculation based on information regarding the particular user's instance of the accounting application. Specifically, the user may accept the autofilled formula (i.e., the community defined formula) when prompted and uses the community defined formula to perform the depreciation calculation in the accounting application instance based on specific asset book value information of a client account. In this manner, the community defined formula is used by the accounting application instance to calculate the depreciation as it is accepted community-wide as the community method to use.

In yet another example, based on the autofilled periodicity (i.e., the community defined periodicity) being accepted by the user, the community defined periodicity is used to initiate the recurring task based on information regarding the particular user's instance of the accounting application. For example, the user may accept the autofilled periodicity (i.e., the community defined periodicity) when prompted and uses the community defined periodicity to initiate an insurance premium adjustment in the accounting application instance based on specific insurance premium amount information of a client account. In this manner, the accounting application instance adjusts the insurance premium according to the community defined periodicity as it is accepted community-wide as the adjustment frequency to use.

Figure 3A:
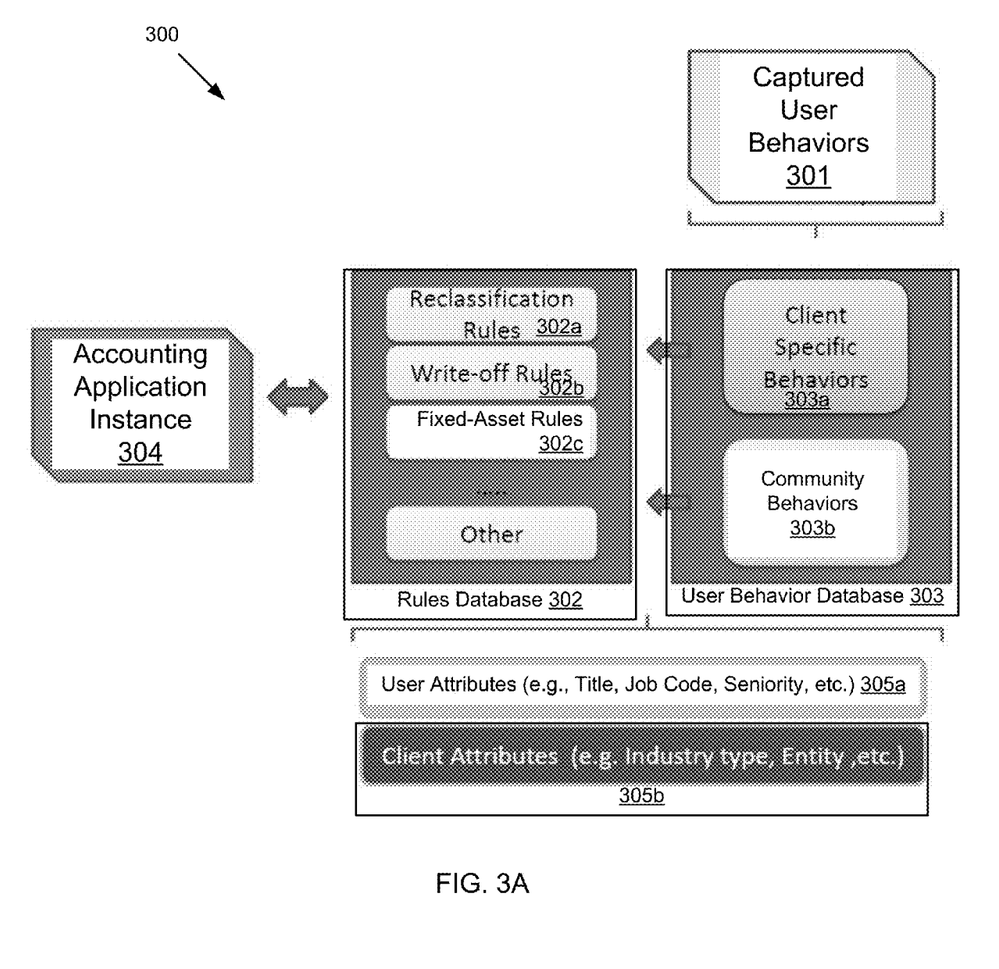
FIGS. 3A-3D show an example of community contributed rules in online accounting systems in accordance with one or more embodiments of the invention.

FIGS. 3A-3D show an example of community contributed rules in online accounting systems in accordance with one or more embodiments of the invention. FIG. 3A shows an example workflow (300) of community contributed rules in online accounting systems based on the system (100) described in reference to FIG. 1 above.

Initially in the workflow element "captured user behaviors" (301), user behaviors in defining classification tags, calculation formulae, and/or recurring task periodicities are captured. For example, the users may be accountants in an accounting firm forming a community to share the classification tags, calculation formulae, and/or recurring task periodicities used in each other's instances of the accounting application. The captured user behaviors are stored as client specific behaviors (303a) in the user behavior database (303). Said in other words, the classification tags, calculation formulae, and/or recurring task periodicities captured from the users for a particular client are stored together in the user behavior database (303) and indexed by an identifier of the particular client. Further, community behaviors (303b) are derived from the client specific behaviors (303a). For example, the community behaviors (303b) may include tallies and scores of the client specific behaviors (303a) based on the user attributes (305a) and client attributes (305b), such as title, job code, seniority, experience level, authority, etc. of each of the users and industry, location, employee count, revenue size, specific requirement, etc. of each of the clients. Accordingly, rules database (302) is generated from the community behaviors (303b), for example by the community input analyzer (123) described in reference to FIG. 1 above. For example, the rules database (302) may include re-classification rules (302a), write-off rules (302b), fixed-asset rules (302c), etc., which are sent to the accounting application instance (304). Examples of the rules in the rule database (302) are described in FIGS. 3B-3D below.

Figure 3B:
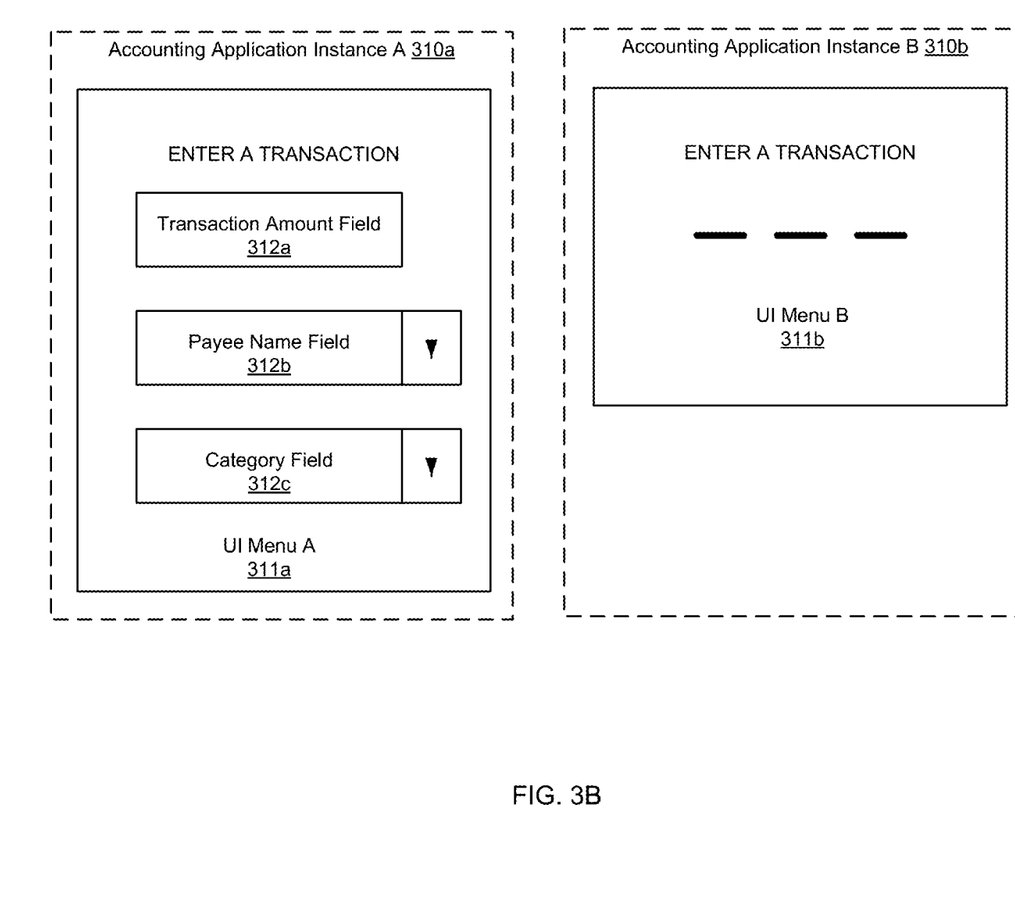

FIG. 3B shows a user interface (UI) menu A (311a) in an accounting application instance A (310a) allowing a user A (not shown) to enter a transaction, and the same menu (i.e., UI menu B (311b)) in an accounting application instance B (310b) allowing a user B (not shown) to enter another transaction. Generally, the UI menu A (311a) is presented to the user A after a particular client account is specified. As shown, the UI menu A (311a) includes data entry/selection fields (312a)-(312c). Specifically, the user A may enter an amount into the transaction amount field (312a), enter a payee name into the payee name field (312b), and enter a classification tag into the category field (312c). Alternatively, the user A may also use a pull-down menu to select a pre-stored payee name for the payee name field (312b) and/or select a pre-stored category for the category field (312c). If the user A has previously entered and categorized a transaction for a particular payee (e.g., a vendor), the next time when another transaction is entered for the same payee by the user A, the category field (312c) is autofilled with the previously used category. Based on the accounting application configuration system and the method described in reference to FIGS. 1 and 2 above, users in the community may share the classification tags they define for the same payee by algorithmically selecting one of the user defined classification tags as the community defined classification tags for categorizing transactions for the vendor. If the category used for the particular client and payee by the user A is selected as the community defined classification tag, it is used to autofill a corresponding category field in the UI menu B (311b) whenever a transaction is entered by the user B using the accounting application instance B (310b) for the same payee in the same client account. For example, the category field in the UI menu B (311b) may be autofilled with "HARDWARE EXPENSE" whenever a transaction is entered by the user B for "ABC Plumbing Store" following the user A's behavior that was selected as the community defined classification tag for purchases with "ABC Plumbing Store." The user B or any other user may over-write the autofilled prompt and reclassify the transaction. The community defined classification tags may be continually updated based on user reclassification over-writing the autofilled prompts.

Figure 3C:
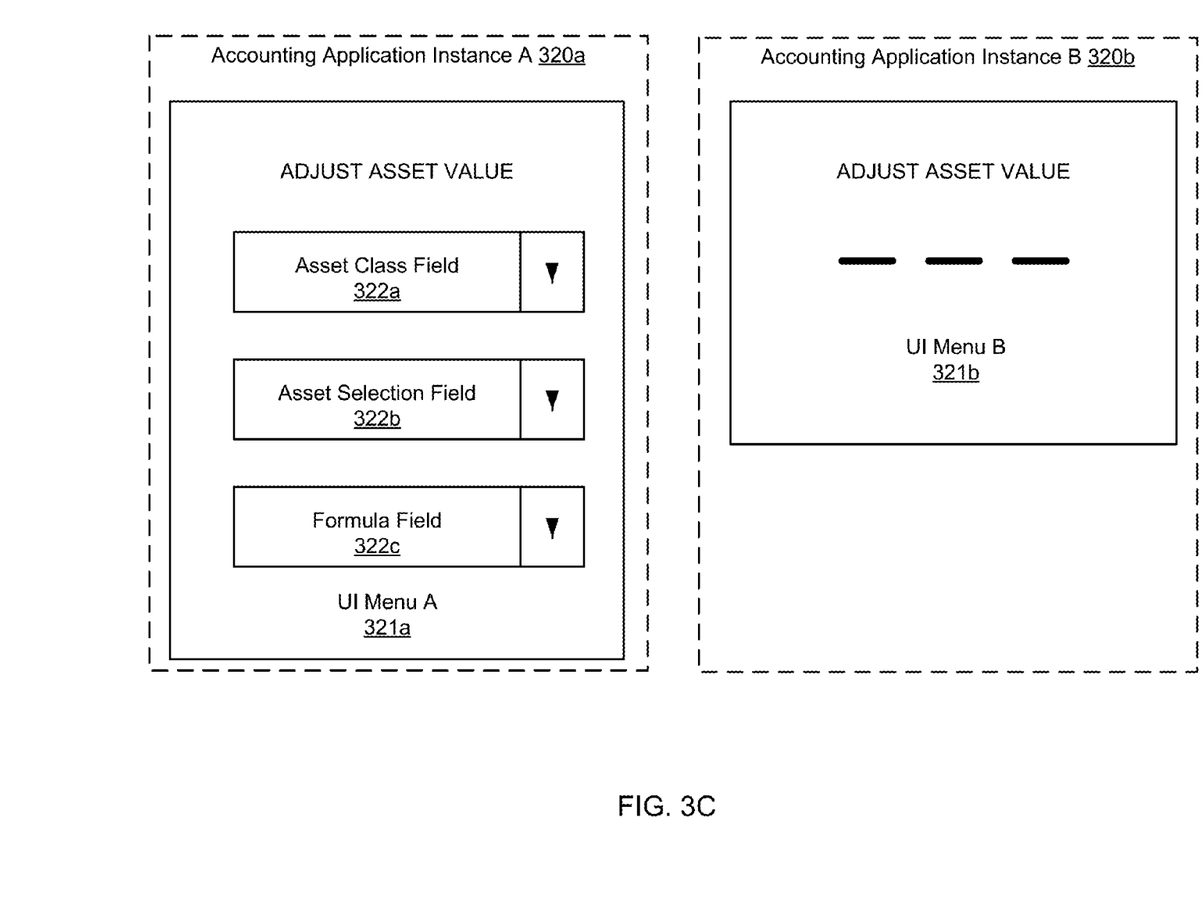

FIG. 3C shows a UI menu A (321a) in an accounting application instance A (320a) allowing a user A (not shown) to adjust (e.g., depreciate) an asset value, and the same menu (i.e., UI menu B (321b)) in an accounting application instance B (320b) allowing a user B (not shown) to adjust another asset value. Generally, the UI menu A (321a) is presented to the user A after a particular client account is specified. As shown, the UI menu A (321a) includes data entry/selection fields (322a)-(322c). Specifically, the user A may enter a class into the asset class field (322a), enter an asset into the asset selection field (322b), and enter an adjustment formula into the formula field (322c). Alternatively, the user A may also use a pull-down menu to select a pre-stored class for the asset class field (322a), select a pre-stored asset for the asset selection field (322b), and/or select a pre-stored formula for the formula field (322c). If the user A has previously adjusted an asset value for any asset in a particular asset class, the next time when another asset in the same asset class is entered or selected by the user A for adjustment, the formula field (322c) is autofilled with the previously used formula. Based on the accounting application configuration system and the method described in reference to FIGS. 1 and 2 above, users in the community may share the formula they use for the same asset class by algorithmically selecting one of the user defined formulae as the community defined formula for adjusting any asset value in the asset class. If the adjustment formula used for the particular asset class by the user A is selected as the community defined formula, it is used to autofill a corresponding formula field in the UI menu B (321b) whenever any asset is entered or selected for adjustment by the user B using the accounting application instance B (320b) for the same asset class. For example, the user A may have depreciated computer equipment using the formula "5% annual depreciation." If this is selected as the community defined formula for adjusting asset values of computer equipments, then the formula field in the UI menu B (321b) may be autofilled with "5% annual depreciation" whenever any asset is entered or selected for adjustment by the user B under the "computer equipment" asset class. The user B or any other user may over-write the autofilled prompt and re-enter or re-select the formula. The community defined formula may be continually updated based on users re-entering or re-selecting another formula over-writing the autofilled prompts.

Figure 3D:
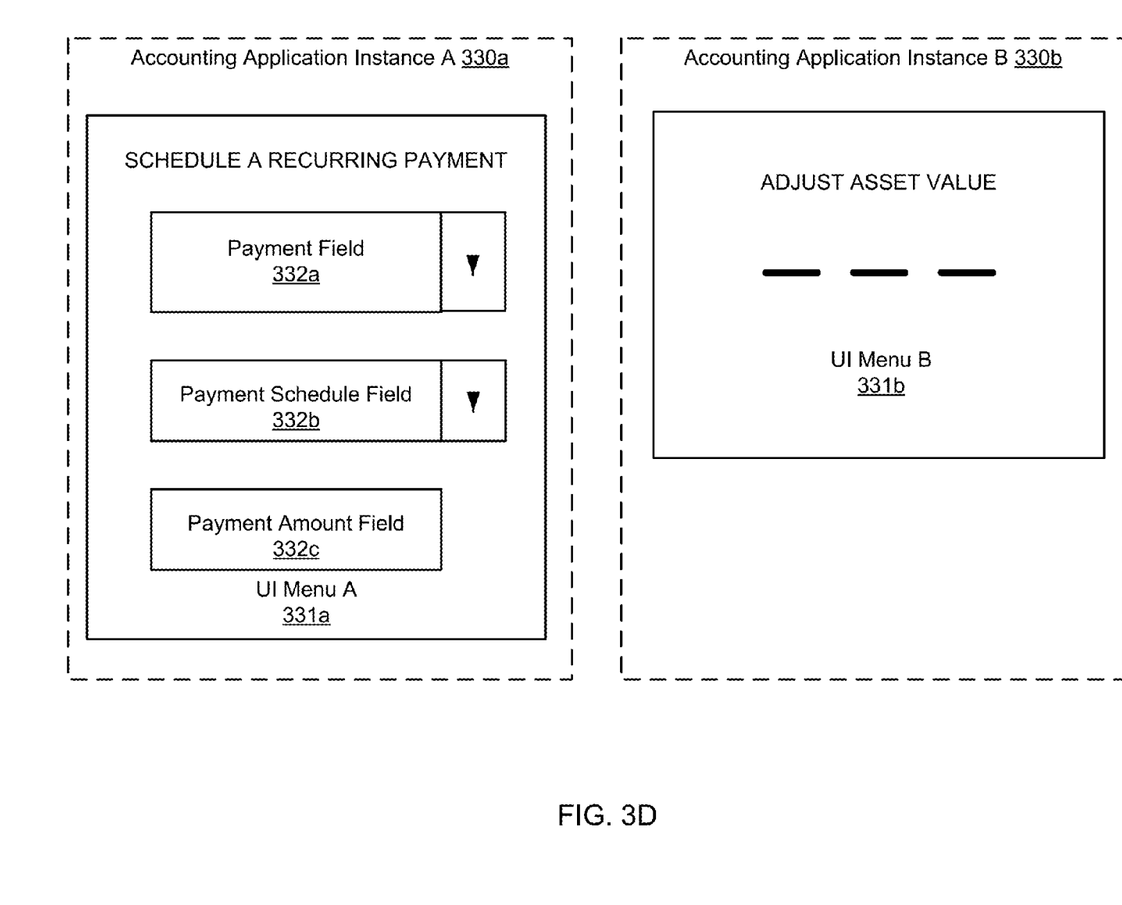

FIG. 3D shows a UI menu A (331a) in an accounting application instance A (330a) allowing a user A (not shown) to schedule a recurring payment, and the same menu (i.e., UI menu B (331b)) in an accounting application instance B (330b) allowing a user B (not shown) to schedule another recurring payment. Generally, the UI menu A (331a) is presented to the user A after a particular client account is specified. As shown, the UI menu A (331a) includes data entry/selection fields (332a)-(332c). Specifically, the user A may enter a particular payment into the payment field (332a), enter a recurring schedule into the payment schedule field (332b), and enter an amount into the payment amount field (332c). Alternatively, the user A may also use a pull-down menu to select a pre-stored payment for the payment field (332a), and/or select a pre-stored schedule for the payment schedule field (332b). Based on the accounting application configuration system and the method described in reference to FIGS. 1 and 2 above, users in the community may share the periodicity they use for scheduling the same payment by algorithmically selecting one of the user defined periodicity as the community defined periodicity for scheduling that payment. If the periodicity used for scheduling a particular payment by the user A is selected as the community defined periodicity for that particular payment, the periodicity is used to autofill a corresponding payment schedule field in the UI menu B (331b) whenever the user B enters or selects the particular payment for scheduling using the accounting application instance B (330b). For example, the user A may have scheduled to pay the insurance premium on monthly basis where each monthly payment equals $1/12$ of the total insurance premium statement balance. If this is selected as the community defined periodicity for scheduling insurance payment, then in the UI menu B (331b), the payment schedule field may be autofilled with "monthly" and the payment amount filed may be autofilled with $1/12$ of an insurance premium statement balance whenever the insurance payment is entered or selected into the payment field. The user B or any other user may over-write the autofilled prompt and re-enter or re-select the periodicity. The community defined periodicity may be continually updated based on users re-entering or re-selecting another periodicity, over-writing the autofilled prompts.

Figure 4:
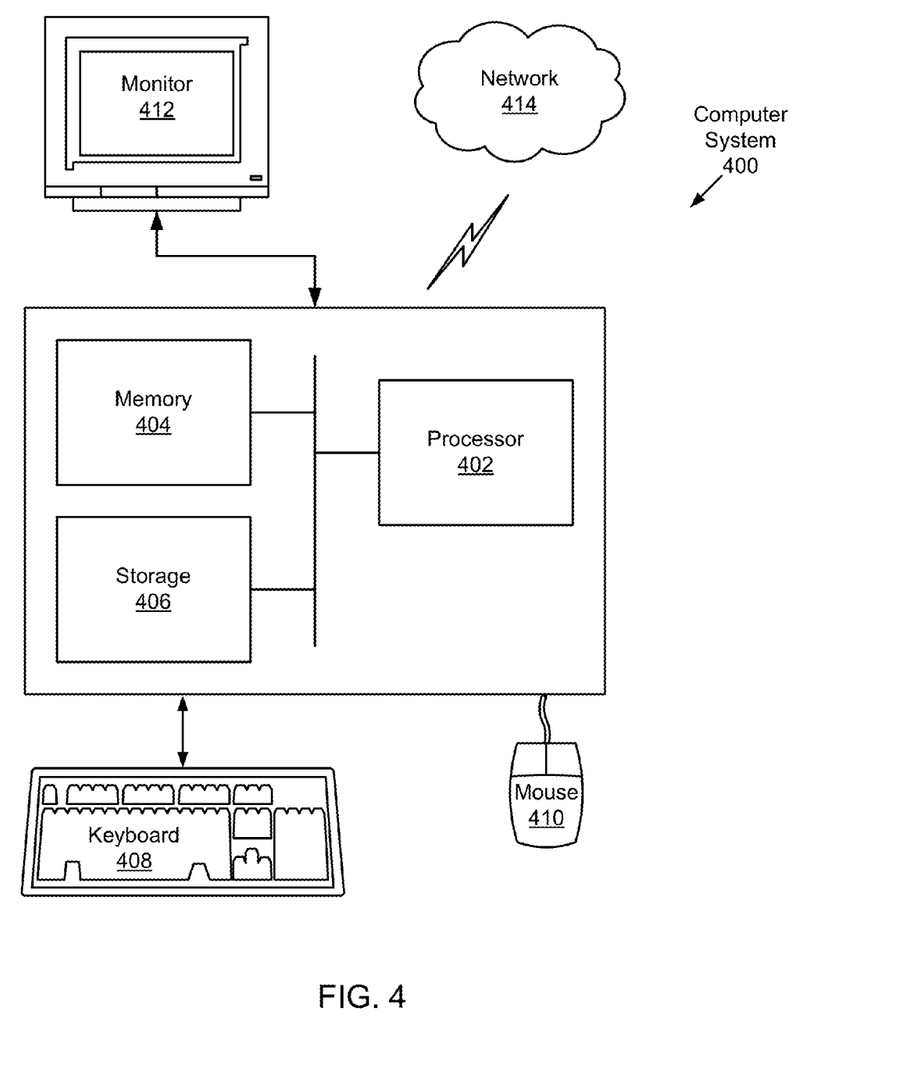
FIG. 4 shows a diagram of a computer in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (414). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of classification within an accounting application, comprising:
    receiving metadata from a plurality of users of the accounting application, wherein the metadata comprises one or more user defined classification tags associated with one or more accounts of the accounting application;
    creating, by a computer processor, one or more community defined classification tags from the metadata, wherein the one or more community defined classification tags specify an category organization of the one or more accounts within the accounting application; and
    sending, in response to a first request from a particular user's instance of the accounting application, the one or more community defined classification tags to the particular user's instance of the accounting application,
    wherein the one or more community defined classification tags are configured to be used by the particular user's instance of the accounting application for presenting, according to the category organization of the one or more accounts, information regarding the particular user's instance of the accounting application to the user.

2. The method of claim 1,
    wherein the category organization includes a grouping of the one or more accounts based on the community defined classification tags,
    wherein the category organization is different than a default category organization.

3. The method of claim 1, further comprising:
    storing the one or more community defined classification tags in a database accessible by the particular user's instance of the accounting application,
    wherein the particular user's instance of the accounting application is executing on at least one selected from a group consisting of a particular user's computer separate from the computer system and the computer system communicatively coupled to a web browser of a particular user's computer.

4. The method of claim 1, wherein the category organization comprises a hierarchical structure.

5. The method of claim 1, further comprising:
    creating a community defined formula from the metadata, wherein the metadata further comprises one or more user defined formulae associated with a pre-determined calculation of the accounting application, wherein the community defined formula specifies a community method to perform the pre-determined calculation within the accounting application; and
    sending, in response to a second request from the particular user's instance of the accounting application, the community defined formula to the particular user's instance of the accounting application,
    wherein the community defined formula is configured to be used by the particular user's instance of the accounting application for performing, using the community method, the pre-determined calculation based on information regarding the particular user's instance of the accounting application.

6. The method of claim 5, wherein the community method to perform the pre-determined calculation is different than a default method to perform the pre-determined calculation.

7. The method of claim 5, further comprising:
    storing the community defined formula in a database accessible by the particular user's instance of the accounting application,
    wherein the particular user's instance of the accounting application is executing on at least one selected from a group consisting of a particular user's computer separate from the computer system and the computer system communicatively coupled to a web browser of a particular user's computer.

8. The method of claim 1, further comprising:
    creating a community defined periodicity from the metadata, wherein the metadata further comprises one or more user defined periodicities associated with a recurring task of an accounting application, wherein the community defined periodicity specifies a periodicity to automatically perform the recurring task within the accounting application; and
    sending, in response to a second request from the particular user's instance of the accounting application, the community defined periodicity to the particular user's instance of the accounting application,
    wherein the community defined periodicity is configured to be used by the particular user's instance of the accounting application for performing the recurring task based on information regarding the particular user's instance of the accounting application.

9. The method of claim 8, wherein the community defined periodicity is different than a default periodicity to perform the recurring task.

10. The method of claim 8, further comprising:
    storing the community defined periodicity in a database accessible by the particular user's instance of the accounting application,
    wherein the particular user's instance of the accounting application is executing on at least one selected from a group consisting of a particular user's computer separate from the computer system and the computer system communicatively coupled to a web browser of a particular user's computer.

11. A computer system for classification within an accounting application, comprising:
   a processor;
   a user module executing on the processor and configured to:
      receive metadata from a plurality of users, wherein the metadata comprises one or more user defined classification tags associated with one or more accounts of an accounting application; and
      send, in response to a first request from a particular user's instance of the accounting application, one or more community defined classification tags to the particular user's instance of the accounting application; and
   a community input analyzer executing on the processor and configured to:
      create the one or more community defined classification tags from the metadata, wherein the one or more community defined classification tags specify a category organization of the one or more accounts within the accounting application,
   wherein the one or more community defined classification tags are configured to be used by the particular user's instance of the accounting application for presenting, according to the category organization of the one or more accounts, information regarding the particular user's instance of the accounting application to the user.

12. The computer system of claim 11,
   wherein the category organization includes a grouping of the one or more accounts based on the community defined classification tags,
   wherein the category organization is different than a default category organization.

13. The computer system of claim 11, further comprising:
   a repository for storing the one or more community defined classification tags in a database accessible by the particular user's instance of the accounting application,
   wherein the particular user's instance of the accounting application is executing on at least one selected from a group consisting of a particular user's computer separate from the computer system and the computer system communicatively coupled to a web browser of a particular user's computer.

14. The computer system of claim 11, wherein the category organization comprises a hierarchical structure.

15. The computer system of claim 11,
   the community input analyzer further configured to create a community defined formula from the metadata, wherein the metadata further comprises one or more user defined formulae associated with a pre-determined calculation of an accounting application, wherein the community defined formula specifies a community method to perform the pre-determined calculation within the accounting application; and
   the user module further configured to send, in response to a second request from the particular user's instance of the accounting application, the community defined formula to the particular user's instance of the accounting application,
   wherein the community defined formula is configured to be used by the particular user's instance of the accounting application for performing, using the community method, the pre-determined calculation based on information regarding the particular user's instance of the accounting application.

16. The computer system of claim 15, wherein the community method to perform the pre-determined calculation is different than a default method to perform the pre-determined calculation.

17. The computer system of claim 15, further comprising:
   a repository for storing the community defined formula in a database accessible by the particular user's instance of the accounting application,
   wherein the particular user's instance of the accounting application is executing on at least one selected from a group consisting of a particular user's computer separate from the computer system and the computer system communicatively coupled to a web browser of a particular user's computer.

18. The computer system of claim 11,
   the community input analyzer further configured to create a community defined periodicity from the metadata, wherein the metadata further comprises one or more user defined periodicities associated with a recurring task of an accounting application, wherein the community defined periodicity specifies a periodicity to automatically perform the recurring task within the accounting application; and
   the user module further configured to send, in response to a second request from the particular user's instance of the accounting application, the community defined periodicity to the particular user's instance of the accounting application,
   wherein the community defined periodicity is configured to be used by the particular user's instance of the accounting application for performing the recurring task based on information regarding the particular user's instance of the accounting application.

19. The computer system of claim 18, wherein the community defined periodicity is different than a default periodicity to perform the recurring task.

20. The computer system of claim 18, further comprising:
   a repository for storing the community defined periodicity in a database accessible by the particular user's instance of the accounting application,
   wherein the particular user's instance of the accounting application is executing on at least one selected from a group consisting of a particular user's computer separate from the computer system and the computer system communicatively coupled to a web browser of a particular user's computer.

21. A non-transitory computer readable storage medium comprising instructions, that when executed, comprise functionality to:
   receive metadata from a plurality of users of the accounting application, wherein the metadata comprises one or more user defined classification tags associated with one or more accounts of the accounting application;
   create one or more community defined classification tags from the metadata, wherein the one or more community defined classification tags specify an category organization of the one or more accounts within the accounting application; and
   send, in response to a first request from a particular user's instance of the accounting application, the one or more community defined classification tags to the particular user's instance of the accounting application,
   wherein the one or more community defined classification tags are configured to be used by the particular user's instance of the accounting application for presenting, according to the category organization of the one or more accounts, information regarding the particular user's instance of the accounting application to the user.

* * * * *